(12) United States Patent
Boils et al.

(10) Patent No.: US 6,210,473 B1
(45) Date of Patent: Apr. 3, 2001

(54) INK COMPOSITION AND PROCESSES THEREOF

(75) Inventors: Danielle C. Boils; James D. Mayo; Yvan Gagnon, all of Mississauga; David N. MacKinnon, Etobicoke, all of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/420,537

(22) Filed: Oct. 18, 1999

Related U.S. Application Data
(60) Provisional application No. 60/107,581, filed on Nov. 9, 1998.

(51) Int. Cl.[7] .................................................. C09D 11/02
(52) U.S. Cl. ...................................... 106/31.43; 106/31.75
(58) Field of Search .............................. 106/31.43, 31.75, 106/31.9, 472, 476

(56) References Cited

U.S. PATENT DOCUMENTS

| | | | |
|---|---|---|---|
| 4,259,675 | * 3/1981 | Mansukhani | 106/31.58 |
| 4,959,661 | * 9/1990 | Buxton et al. | 106/31.65 |
| 4,994,520 | 2/1991 | Mori et al. | 524/547 |
| 5,026,427 | 6/1991 | Mitchell et al. | 106/31.6 |
| 5,164,232 | 11/1992 | Henseleit et al. | 427/288 |
| 5,184,148 | 2/1993 | Suga et al. | 346/1.1 |
| 5,281,261 | 1/1994 | Lin | 106/31.6 |
| 5,397,807 | 3/1995 | Hitchcock | 521/76 |
| 5,672,198 | 9/1997 | Belmont | 106/31.6 |
| 5,698,016 | 12/1997 | Adams et al. | 106/31.6 |
| 5,725,647 | 3/1998 | Carlson et al. | 106/31.86 |
| 5,725,650 | 3/1998 | Flenniken et al. | 106/476 |

* cited by examiner

*Primary Examiner*—Helene Klemanski
(74) *Attorney, Agent, or Firm*—John L. Haack

(57) ABSTRACT

An ink composition including: an aqueous liquid vehicle, a colorant, and an amino bisphosphonate dispersant compound.

19 Claims, No Drawings

INK COMPOSITION AND PROCESSES THEREOF

REFERENCE TO COPENDING APPLICATIONS AND ISSUED PATENTS

Priority is claimed from Provisional Application Ser. No. 60/107,581, filed Nov. 9, 1998.

Attention is directed to commonly owned and assigned U.S. Pat. No. 5,164,232, issued Nov. 17, 1992, entitled "Ink Compositions", which patent discloses an ink composition which comprises an aqueous liquid vehicle, a colorant, and a phosphate ester; and U.S. Pat. No. 5,281,261, issued Jan. 25, 1994, entitled "Ink Compositions Containing Modified Pigment Particles", which patent discloses an ink composition comprising an aqueous liquid vehicle and pigment particles having attached to the surfaces thereof a polymerized vinyl aromatic salt. In one embodiment, the polymeric vinyl aromatic salt is chemically grafted to the surfaces of the pigment particles; in another embodiment, the polymeric vinyl aromatic salt is adsorbed onto the surfaces of the pigment particles.

The disclosures of each the above mentioned patents are incorporated herein by reference in their entirety. The appropriate components and processes of these patents may be selected for the inks and processes of the present invention in embodiments thereof.

BACKGROUND OF THE INVENTION

The present invention is generally directed to ink compositions and imaging processes thereof, and more specifically, the present invention is directed to ink compositions containing highly stabilized pigment particles and dispersions thereof and improved ink jetting and printing properties arising therefrom. Even more specifically, the present invention is directed to substantially stable carbon black ink dispersions and wherein the resulting inks possess a number of advantages such as excellent jetting characteristics and superior developed images with excellent resolution.

PRIOR ART

In U.S. Pat. No. 5,672,198, issued Sep. 30, 1997, to Belmont, there is disclosed an aqueous ink composition which include a modified carbon product comprising a carbon having attached at least one organic group that is substituted with an ionic or an ionizable group. A coating composition is also described and comprises water, a binder, and a modified carbon product having at least one organic group attached to carbon wherein the organic group is substituted with an ionic or an ionizable group.

In U.S. Pat. No. 5,397,807, issued Mar. 14, 1995, to Hitchcock, et al., there is disclosed a compatibilized carbon black useful in melt processing of plastic material. The carbon black is coated with a compatibilizing agent which enhances the dispersibility of the carbon black in a melt of the plastic material. Further disclosed are processes for making plastic foam structures with the compatibilized carbon black.

In U.S. Pat. No. 5,698,016, issued Dec. 16, 1997, to Adams, et al., there is disclosed a composition which comprises a) an amphiphilic ion, and b) a modified carbon product comprising carbon having attached at least one organic group. The organic group has a charge opposite to the amphiphilic ion. Also disclosed are aqueous and non-aqueous ink and coating compositions incorporating this composition. Ink jet ink compositions are further described incorporating this composition.

In U.S. Pat. No. 4,994,520, issued Feb. 19, 1991, to Mori, et al., there is disclosed a carbon black-graft polymer, produced by causing a polymer possessing within the molecular unit thereof at least one reactive group selected from the class consisting of aziridine group, oxazoline group, N-hydroxyalkylamide group, epoxy group, and thioepoxy group to react with carbon black. The polymer can be used as a toner for electrostatically charged image, resin composition, coating composition, ink for thermographic transfer, coating agent for magnetic recording medium, rubber composition, and carbon black dispersion and the like.

In U.S. Pat. No. 5,725,647, issued Mar. 10, 1998, to Carlson, et al., there is disclosed pigmented inks comprising an aqueous medium, a pigment, a dispersant, and a humectant. The humectant is a sulfonated polyethylene oxide which provides long decap times and fast drying of the printed image. Inks are further disclosed where the dispersant is an alkyl(sulfophenoxy)benzenesulfonic acid or its salt. Such dispersants reduce the agglomeration of pigment particles and reduce or eliminate the deposition of foreign substances on heater elements during the jetting process. A variety of pigments, dispersants, humectants, and aqueous media can be used. Combinations of a sulfonated polyethylene oxide humectant and an alkyl(sulfophenoxy) benzenesulfonic acid (salt) dispersant provide inks with good stability, few kogation problems, long decap times and relatively fast drying times.

In U.S. Pat. No. 5,725,650, issued Mar. 10, 1998, to Flenniken, et al., there is disclosed a treated carbon black produced by treating with at least one polyethylene glycol having a weight of from about 1,000 to about 1,000,000. The treated carbon black may be used in forming polymeric compositions, such as semi-conductive and insulating compounds, for example for use in electrical cables.

In U.S. Pat. No. 5,184,148, issued Feb. 2, 1993, to Suga, et al., there is disclosed an ink comprising an aqueous liquid medium which contains acid carbon black having a volatile content within the range of 3.5 to 8% by weight and a water-soluble resin having a weight average molecular weight within the range of 3,000 to 30,000, wherein the weight ratio of the acid carbon black to the water-soluble resin is within the range of 3:1 to 10:1. The present invention also relates to an ink jet recording method, and ink jet device, an ink cartridge and an ink jet recording apparatus which uses the ink.

In U.S. Pat. No. 5,026,427, issued Jun. 25, 1991, to Mitchell, et al., there is disclosed a process for the preparation of pigmented ink jet inks comprising: (a) mixing at least one pigment and at least one pigment dispersant in a dispersant medium to form a pigmented ink mixture wherein pigment is present in an amount up to 60% by weight based on the total weight of the mixture; (b) deflocculating the pigmented ink mixture by passing the pigmented ink mixture through at least a plurality of nozzles within a liquid jet interaction chamber at a liquid pressure of at least 1,000 psi to produce a substantially uniform dispersion of pigment particles in the dispersant medium.

The aforementioned patents are incorporated by reference herein in their entirety.

The ink compositions and processes of the present invention are useful in many applications including imaging and printing processes, including color printing, for example, thermal ink jet (TIJ), bubble jet, and acoustic ink printing systems, including digital systems.

Moreover, an important requirement for ink jet inks, especially for pigment, such as carbon black, based inks, is for the pigment dispersion to remain stable throughout the life of the ink jet cartridge. Typical dye-based ink jet inks suffer from deficiencies in water fastness, smear resistance and light fastness after being printed on various substrates. Pigments provide an image, on a wide variety of substrates, having high optical density with high water fastness, smear resistance and light fastness. Therefore, pigments are a preferred alternative to dyes, provided the pigment dispersions can be made stable to prevent flocculation and/or aggregation and settling. Some co-solvents that are good as clogging inhibitors cause destablization of pigment dispersions and cannot be used in pigmented inks.

There is thus a need for aqueous ink compositions that can be utilized in high resolution ink jet printers. Additionally, there is a need for stable pigmented inks that provide high latency and also remain stable throughout the life of the ink jet cartridge. There is also a need for stable pigmented inks that provide high optical density in a single application or pass. Also, there is a need for ink jet inks wherein paper curl, and/or image smearing can be eliminated or minimized when such inks are selected for ink jet printing processes.

SUMMARY OF THE INVENTION

Embodiments of the present invention, include:

An ink composition comprising: aqueous liquid vehicle, a colorant, and an amino bisphosphonate stabilizing compound of the formula:

and

An imaging processes comprising the development of images with the aforementioned ink compositions in an ink jet printing machine.

DETAILED DESCRIPTION OF THE INVENTION

The present invention provides, in embodiments:

An ink composition comprising: aqueous liquid vehicle, a colorant, and an amino bisphosphonate compound;

An ink composition comprising: aqueous liquid vehicle, colorant particles having closely held to the surface thereof at least one alkoxylated amino bisphosphonate stabilizing compound of the formula

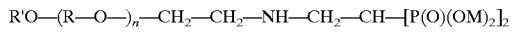

wherein R is an alkyl with from 1 to about 20 carbon atoms, $R^1$ is an alkyl, or carboxylate with from 1 to about 20 carbon atoms, or an aryl or alkyl aryl with from about 6 to about 30 carbon atoms, n is a number of from about 20 to about 70, and M is a counter cation salt group including —H, an alkali metal, an alkaline earth, and ammonium ion, an alkyls with from 1 to about 20 carbon atoms, and mixtures thereof, such as $H^+$, $Li^+$, $K^+$, $Na^+$, $Rb^+$, $Cs^+$, ammonium, and alkyl substituted ammonium ion.

The colorant particles can have a particle size distribution where at least about 75 percent, for example, from about 70 to about 90, of the particles have a diameter below about 0.15 microns, that is, for example from about 0.01 to about 0.14 microns in volume average diameter with the remaining particles in the dispersion having a diameter less than or equal to about 0.5 micron, such as from about 0.5 to about 1 micron. More specifically the inks of the present invention are comprised of a major amount of water, stabilized pigment particles, especially carbon black, alkylene glycols, such as ethylene glycol, and other known ink additives such as biocides, sulfolane, and the like. The present invention also relates to high resolution printing processes comprising applying the inks in image-wise fashion to a substrate.

The inks possess a latency of at least 20 seconds, for example, from about 20 to about 40 seconds, in a printer having at least one nozzle of a channel width or diameter ranging from about 10 to about 40 microns, and wherein the ink remains stable for extended time periods, up to a year of closed storage at ambient conditions with no settling or jelling.

The stable inks of the present invention contain a colorant such as a pigment, preferably carbon black having absorbed thereon a amino phosphonate functionalized poly(alkylene oxide) compound, more specifically, a polyalkylene oxide, such as a polyethylene oxide functionalized with an amino phosphonate group. Thus in the present invention the aforementioned stabilized carbon blacks can be readily formulated into ink compositions and can be stored for about one year without any adverse effects, such as settling and jelling. A related patent is U.S. Pat. No. 5,629,452 which discloses a process for making polyoxyalkylated amines.

The colorant particles can be pigments such as carbon black, magnetites, and colored pigments for color printing applications as identified herein, and mixtures thereof, and can be selected in an amount of from about 1 to about 20 weight percent, and preferably in an amount of from about 2 to about 7 weight percent of the total ink mixture. The colorant can also be or in addition to a colorant include one or more dye compounds which are weakly or substantially in soluble in the final ink formulation, the can be present in amounts of from about 0.1 to about 10 weight percent or more but not exceeding about 15 percent by weight based on the total ink mixture a dye compound.

When the colorant is a pigment, there is selected or preferred pigment particle sizes in the final ink formulation of from about 0.05 to about 10 microns, and preferably from about 0.02 to about 5 microns, and more preferably from about 0.02 to about 4 microns. When a carbon black dispersion is selected as the colorant a preferred particle size distribution is with at least about 90 percent by weight of the particles with a diameter of about 0.05 to about 0.2 microns and the balance of particles with a diameter of about 0.2 to about 2.0 microns.

A preferred pigment is carbon black, and a preferred alkoxylated amino bisphosphonate stabilizing compound is of the formula

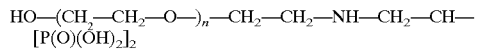

wherein n is a number of from about 20 to about 70. A more preferred alkoxylated amino bisphosphonate stabilizing compound is wherein n is a number of from about 35 to about 55. The stabilizer compound can have weight average molecular weight, for example, from about 2,200 to about 4,000, and can be present in an amount of from about 0.05 to about 5 percent by weight, and more preferably from about 0.09 to about 2 weight percent of the total ink mixture. The weight ratio of the carbon black to the stabilizer compound can from about 3:1 to about 10:1.

In embodiments, there is provided an ink composition comprising:
an aqueous liquid vehicle;
pigment particles;
and an alkoxylated amino bisphosphonate compound selected from the group consisting of a) compounds of the formula

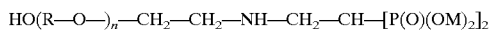
HO(R—O—)$_n$—CH$_2$—CH$_2$—NH—CH$_2$—CH—[P(O)(OM)$_2$]$_2$ wherein R is an alkyl with from 1 to about 20 carbon atoms, n is a number of from about 20 to about 70, and M is —H, an alkali metal, an alkaline earth, and ammonium ion, and an alkyl with from 1 to about 20 carbon atoms; and b) compounds of the formula

R$^1$O—(R—O—)$_n$—CH$_2$CH$_2$—NH—CH$_2$—CH—[P(O)(OM)$_2$]$_2$ wherein R is an alkyl with from 1 to about 20 carbon atoms, R$^1$ is an alkyl, or carboxylate with from 1 to about 20 carbon atoms, or an aryl or alkyl aryl with from about 6 to about 30 carbon atoms, n is a number of from about 20 to about 70, and preferably from about 35 to about 55, and M is —H, an alkali metal, an alkaline earth, an ammonium ion, and an alkyl with from 1 to about 20 carbon atoms.

The colorant for the ink compositions of the present invention is preferably a pigment, although it is readily understood by one of ordinary skill in the art that non pigment compounds can be used in place of a pigment or in addition to a pigment. The pigment is preferably carbon black, examples of other pigments include cyan, magenta, yellow, red, blue, green, brown, mixtures thereof, and the like Preferred carbon black pigments for use in the present invention include LEVANYL® carbon black from Cabot Corporation, and FLAME BLACK® carbon black from Prolabo Corporation. Examples of suitable black pigments include other known carbon blacks such as channel black, furnace black, lamp black, and the like. Colored pigments include red, green, blue, brown, magenta, cyan, and yellow particles, and mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthrathrene Blue, identified in the Color Index as CI 69810, Special Blue X-2137, and the like. illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy4-sulfonanilide phenylazo4'-chloro-2,5-dimethoxy acetoacetanilide, Permanent Yellow FGL, and the like. Preferred pigment dispersions include carbon blacks, such as Hostafine Black (T and TS), Sunsperse 9303, and more preferably LEVANYL BLACK from BASF.

Preferably, the pigment particle size of a size to enable a stable colloidal suspension of the particles in the liquid vehicle and to prevent clogging of the ink channels when the ink is used in a thermal ink jet printer. Preferred average particle diameters are generally from about 0.001 to about 5 microns, and more preferably from about 0.01 to about 3 microns, although the particle size can be outside these ranges. A more preferred pigment particle size includes particles having at least 70% of the particles being below about 0.1 micron with no particles being greater than 1.0 micron, as measured with a Nicomp Particle Size Analyzer. An even more preferred pigment particle size includes particles having at least 90% of the particles below about 0.1 micron with no particles being greater than 1.0 micron.

The pigment can be present in the ink composition in various effective amounts for example, from about 1 to about 20 percent by weight, preferably from about 3 to about 7 percent by weight, more preferably from about 4 to about 6 percent by weight and most preferably from about 5 to about 6 percent, although the amount can be outside of these ranges.

Polymeric performance additives can also be added to the inks to enhance the viscosity of the ink, including water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethyleneimines modified with polyethylene oxide and polypropylene oxide, such as the DISCOLE® series available from DKS International, Tokyo, Japan, the JEFFAMINE® series available from Texaco, Bellaire, Tex., and the like additives. Polymeric additives may be present in the ink in amounts of from 0 to about 10 percent by weight, preferably from about 0.001 to about 8 percent by weight, and more preferably from about 0.01 to about 5 percent by weight, although the amount can be outside these ranges.

Further optional additives to the inks include biocides such as DOWICIL 150, 200, and 75, benzoate salts, sorbate salts, and the like, present in an amount of from 0 to about 10 percent by weight, preferably from about 0.001 to about 8 percent by weight, and more preferably from about 0.01 to about 4.0 percent by weight, although the amount can be outside these ranges, penetration control additives such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, although the amount can be outside these ranges, pH controlling agents such as acids or, bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges, and the like.

Other examples of suitable ink additives include those illustrated in U.S. Pat. Nos. 5,223,026 and 5,207,825, the disclosure of each of which are totally incorporated herein by reference.

The inks of the present invention can be prepared by any suitable conventional process and variants thereof, for example, mixing water, a pigment, and a water miscible or dispersible pigment stabilizing compound, for example, of the formula

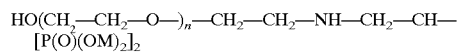
HO(CH$_2$—CH$_2$—O—)$_n$—CH$_2$—CH$_2$—NH—CH$_2$—CH—[P(O)(OM)$_2$]$_2$ where M and n are as defined herein;

attriting the mixture until the pigment particles have an average particle diameter of from about 0.001 to about 20 microns; optionally heating the mixture to further associate, affix, or attach the stabilizing compound upon the surface of the pigment particles; optionally separating the pigment particles with stabilizing compound associated or affixed thereon from the mixture; and admixing the surface treated pigment particles with an aqueous liquid vehicle comprising water and optionally a humectant to provide an ink with a viscosity of about 10 centipoise; and thereafter further refining the ink if desired by, for example, centrifugation and filtration to remove pigment particles with an average particle diameter of greater than about 1 micron.

Aqueous ink compositions according to the present invention may also be provided by mixing the formed inks with humectants, and other ink additives. The mixing can be done by various methods including homogenizing, sonification, microfluidization, mechanical mixing, magnetic stirring, high speed jetting, and the like. The sonification process is preferred since such process provides a homogeneous dispersion by evenly distributing the dispersant throughout the pigment dispersion. The stabilized dispersed pigment can be used as an ink as is, but preferably the thoroughly mixed pigment ink mixture is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large pigment particles from the ink. Centrifuging is preferably conducted for a time sufficient to remove large size particles and at a rate of about 4,000 to 8,000 rpm. The continuous centrifuge process is very useful in the commercial production of large quantities of pigment ink for the separation of large pigment particles from the ink. The ink is also preferably subjected to a filtration process which utilizes various commercial filtration media including cartridges constructed from nylon, polyester, TEFLON®, polysulfone, and other suitable polymeric materials; membranes; porous ceramic media; cloth; and the like. The filter is of a size that removes particles greater than about 3 microns, preferably greater than 1.2 micron, and more preferably greater than about 1 micron. Any suitable filtration method, such as continuous and/or batch filtration methods, may be used. Continuous filtration methods are preferred for large scale production of pigment inks. Inks which have been centrifuged and filtered so as to preferably remove particles greater than 1 micron in size from the ink are suitable for use as ink jet inks because of their ability to not clog the ink jet and their long latency and jetting stability.

Inks of the present invention can be formulated in an aqueous liquid vehicle such as deionized water and homogenous mixtures of water and suitable miscible organic solvents, and the aqueous liquid vehicle can be present in an amount of from about 75 to about 99 weight percent of the total ink composition.

The liquid vehicle of the inks include a major amount of water, for example from about 50 to about 99, and preferably from about 75 to about 80 weight percent, and more preferably from about 75 to about 99 weight percent of the total composition and may comprise a mixture of water and a miscible organic component, such as glycols, for example, ethylene glycol, propylene glycol, diethylene glycols, glycerine, dipropylene glycols, polyethylene glycols, polypropylene glycols; amides; ethers; carboxylic acids; esters; alcohols; organosulfides; organosulfoxides; sulfones; dimethylsulfoxide; sulfolane; alcohol derived compounds, such as carbitol, butyl carbitol, CELLUSOLVE, and ethers thereof; amino alcohols; ketones; and other water miscible materials, and mixtures thereof.

The inks of the present invention can optionally contain one or more known performance additives such as biocides, humectants, chelating agents, viscosity modifiers, and mixtures thereof, including glycols in an amount of from about 10 to about 20 weight percent, and more preferably from about 12 to about 16 weight percent, sulfolanes. in an amount of from about 2 to about 6 weight percent, and more preferably about 2 to about 4 weight percent, biocides in the amount of about 0.01 to about 0.1 weight percent, and surfactants, for example, DOWICIL 200, in the amount of about 0.01 to about 0.1 weight percent. The humectant can be for example, ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, CELLUSOLVE, ether derivatives, amino alcohols, ketones, and mixtures thereof, and can be present in an amount of from about 3 to about 60 percent by weight of the total weight of the ink composition When mixtures of water and water miscible organic liquids are selected as the liquid vehicle, the water to organic ratio may any effective range, and typically is from about 100:0 to about 30:70, preferably from about 97:3 to about 50:50, although the ratio can be outside these ranges. The non-water component of the liquid vehicle generally serves as a humectant which has a boiling point higher than water (100° C.). The pigment dispersion can be mixed with different humectants or solvents in ink jet inks including ethylene glycol, diethylene glycol, propylene glycol, dipropylene glycol, polyethylene glycols, polypropylene glycols, glycerine, trimethylolpropane, 1,5 pentanediols, 1,6 hexanediols, diols and triols containing from about 2 to about 10 carbons, sulfoxides for example, dimethylsulfoxide, alkylphenyl sulfoxides, and the like, sulfones such as sulfolane, dialkyl sulfones, alkyl phenyl sulfones, and the like, amides for example N,N-dialkyl amides, N,N-alkyl phenyl amides, N-methylpyrrolidinone, N-cyclohexylpyrrolidinone, N,N-diethyltoluamide, and the like, ethers such as alkyl ether derivatives of alcohol, ether diols, and ether triols including butylcarbitol, alkyl polyethyleneglycols, and the like, urea, betaine, the thio (sulfur) derivatives of the aforementioned compounds, for example, thioethylene glycol, trithioethylene glycol, and the like. Desired penetrants, water soluble polymers, pH buffer, biocides, chelating agents, such as EDTA and the like, and optional additives can also be used.

Another important measured property for an ink jet ink is the latency or decap time, which is the length of time over which an ink remains fluid in a print head opening or nozzle when exposed to air and, therefore, capable of firing a drop of ink at its intended target. Latency is the maximum idling times allowed for ink to be jetted by a printer with a speed equal to or greater than about 5 meters per second which is equivalent to an ink traveling a distance of 0.5 mm in less than 100 microseconds without a failure. The latency test is accomplished with the printed or nozzles uncovered or decapped and generally at a relative humidity of about 15 percent. The time interval is the longest length of time that the print head, uncovered, will still fire a specified drop without drop displacement or loss of density. The longer the latency time rating, the more reliable and desirable the ink. The many of inks of the present invention possess of these characteristics. The inks possess excellent latency. Generally, the inks possess a latency of at least about 10 seconds, more generally on the order of about 40 seconds to greater than about 1,000 seconds, with a minimum latency of at least 10 seconds being preferred. The inks of the present invention can have jetting a latency of from about 1 to about 20 seconds, and preferably from about 5 to about 10 seconds.

The viscosity of the inks can be from of about 1.0 cP (centipoise) to about 5.0 cP, and exhibit a drying time of no more than about 15 seconds when jetted onto plain paper in an ink jet printing process at ambient conditions.

According to the invention, the surface tension of the pigment dispersions and are preferably greater than about 40 dynes/cm², more preferably greater than 45 dynes/cm², and most preferably greater than 50 dynes/cm². Ink compositions according to the invention possess surface tensions is in the range of about 20 dyne/cm to about 70 dyne/cm, and preferably greater than about 40 dynes/cm², preferably greater than about 45 dynes/cm², and most preferably greater than about 50 dynes/cm². The viscosity of the ink composition is less than about 3.0 cP, preferably less than about 2.5 cP, and more preferably about 2 to about 2.8 cP.

The present invention provides imaging processes comprising the development of an image with the ink compositions as disclosed and illustrated herein in an ink jet printing machine. An exemplary imaging process comprises applying in image-wise fashion to a receiving substrate in an ink jet printer having at least one nozzle of a channel width or diameter ranging from about 10 to about 4 microns the ink composition comprising an aqueous liquid vehicle, a colorant, and an amino bisphosphonate stabilizing compound of the formula:

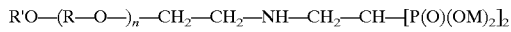

where R, R', M, and n are as defined herein, and wherein high resolution images result, for example, a preferred ink jet printing apparatus employs a thermal ink jet printing process and droplets of ink are caused to be ejected by selectively heating the ink and wherein there are provided moderate to high resolution, for example, 300, and more preferably 600 spots per inch (spi), and wherein the ink drop ejection is preferably accomplished on-demand. Thus there are provided processes for generating images on a substrate comprising incorporating one or more ink compositions of the present invention into an ink jet printing apparatus and causing droplets of the ink composition to be ejected in an imagewise pattern onto the substrate, the substrate being for example, paper, transparency materials, plastics, polymeric films, metals, and wood, wherein the image formed on the substrate dries in no more than 15 seconds.

The inks can be selected for use in ink jet printing processes, and especially thermal ink jet processes and image smearing is minimal, or avoided. In embodiments the present invention relates to imaging processes and jet inks comprised of an aqueous liquid vehicle such as water, stabilizing compound associated with the pigment, such as carbon black, and known ink additives such as glycols, sulfolanes, and the like, and which inks enable a number of advantages, when the inks are selected for ink printing processes, such as thermal ink jet processes. Moreover, images developed with the inks of the present invention enable ink jet prints with excellent resolution, acceptable density, excellent waterfastness, minimum or very low show through, and excellent Mid Frequency Line Edge Noise (MFLEN).

Ink jet printing can be considered a non-impact printing method that produces droplets of ink that are deposited on a substrate such as paper or transparent film in response to an electronic digital signal. Thermal or bubble jet drop-on-demand ink jet printers have found broad application as output devices for personal computers in the office and the home.

In existing thermal ink jet printing, the print head typically consists of one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels, at predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. This is a very transient phenomenon, and the ink is quickly propelled toward a receiving print sheet. As the bubble begins to collapse, the ink still in the channel between the nozzle and bubble starts to move towards the collapsing bubble, causing a volumetric contraction of the ink at the nozzle and resulting in the separation from the nozzle of the bulging ink as a droplet. The feed of additional ink provides the momentum and velocity for propelling the droplet towards a receiving print sheet, such as a piece of paper. Since the droplet of ink is emitted only when the resistor is actuated, this type of thermal ink-jet printing is known as "drop-on-demand" printing. Other types of ink-jet printing, such as continuous-stream or acoustic, are also known.

In a single-color ink jet printing apparatus, the print head typically comprises a linear array of ejectors, and the print head is moved relative to the surface of the print sheet, either by moving the print sheet relative to a stationary print head, or vice-versa, or both. In some types of apparatus, a relatively small print head moves across a print sheet numerous times in swathes, much like a typewriter. Alternatively, a print head which consists of an array of ejectors and extends the full width of the print sheet may be passed once down the print sheet to give full-page images, in what is known as a "full-width array" (FWA) printer. When the print head and the print sheet are moved relative to each other, image-wise digital data is used to selectively activate the thermal energy generators in the print head over time so that the desired image will be created on the print sheet.

In view of the demand for higher resolution printers, the nozzles in ink jet printers are continuing to decrease in size. Nozzle openings are typically about 50 to 80 micrometers in width or diameter, for example as found in a 300 spots per inch(spi) printer. With the advent of 600 spi printers, these nozzle openings are typically about 10 to about 40 micrometers in width or diameter. These small dimensions require inks which do not plug the openings.

Thus an important requirement for an ink jet ink is the property of being thermally and gravitationally stable, that is, with minimal or no settling of suspended componentry, the ability of the ink to remain in a fluid condition in a print head orifice or opening on exposure to air.

In imaging processes the ink may be applied to a suitable substrate in an image-wise fashion. Application of the ink to the substrate can be by any suitable process compatible with aqueous-based inks, such as flexographic printing, pen plotters, continuous stream ink jet printing, drop-on-demand ink jet printing including both piezoelectric and thermal ink jet processes, and the like printing devices. The substrate employed can be any substrate compatible with aqueous-based inks, including plain paper, such as Xerox® series 10 paper, Xerox® 4024 paper, and the like, coated papers, such as those available from Jujo, transparency materials suitable for aqueous inks or ink jet printing processes, and the like receivers.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

Ink Viscosity

Viscosity was measured using a Brookfield viscometer at a rpm of 3000 1/s, reference Table 1 below.

Ink Latency

Latency was measured in a 256 jet orifice experimental jetting device operated in an environment of 15% relative humidity (RH) and 35° C. Testing was carried out on the standard PERF test equipment using "AIM" software and latency protocol. The testing is done at 1 KHz heater pulse frequency. Pass criterion is defined as when a first drop transit time less than or equal to 100 microseconds over a 0.5 millimeter distance for an idle time equal or greater than a predetermined period of time (1 to 10,000) in seconds is achieved, reference Table 1 below.

Smear Measurement

Smear data were obtained by rubbing under pressure the wire side of the selected paper against the felt side of the same paper. On the felt side was printed a black image (1.25"square). The optical density of the smeared image (wire side paper) was obtained with a Macbeth TR927 density meter. Under these testing conditions, the control sample HP 1 600C black print has a smear optical density (OD value) of about 0.030 on both papers, reference the evaluation and print quality in Table 2.

TABLE 1

| | Ink Properties | |
| --- | --- | --- |
| Example # | Latency (seconds) | Viscosity (cP) |
| I | 10 | 2.1 |
| II | 40 | 2.2 |

In Table 2 7NT and 18NT refers to two types of papers: 7NT is Xerox Corporation 4024 and 1 8NT is LX series paper. The inks were tested on both papers. The top and bottom in the MFLEN column refer to the top of the printed line and the bottom of the printed line where MFLEN was measured and as seen on a computer screen controlling the measurement.

TABLE 2

| | Ink Print Quality | | | | | |
| --- | --- | --- | --- | --- | --- | --- |
| | Optical Density | | MFLEN | | Smear ratio | |
| Example # | 7NT | 18NT | 7NT | 18NT | 7NT | 18NT |
| I | 1.43 | 1.4 | Top 0 | 2.6 | 0.05 | .05 |
| | | | Bot. 3.2 | 4.2 | | |
| II | 1.45–1.55 | | Top 0 | 4.3 | 0.08 | .07 |
| | 1.42–1.53 | | Bot. 0.1 | 2.5 | | |
| Control HP1600C | 1.54 | 1.38 | Top 3.1 | 4.1 | 0.04 | 0.03 |
| | | | Bot. 0.1 | 2.3 | | |

Inks were prepared and evaluated in accordance with the following Examples.

EXAMPLE I

To 3 grams of RAVEN 5750 carbon black dispersion from Columbia was added 2 grams of polyethyleneoxide amino bisphosphonate with a molecular weight of about 2,500 followed by ball milling in a 30 mL glass bottle with ⅜" steel balls for 60 hours. The ink was completed by adding 3.34 grams of sulfolane and 13.59 grams of ethylene glycol to 18.27 grams of the dispersion, and then adding 15 grams of water to provide a final composition in weight percent: 6% RAVEN 5750 carbon black stabilized dispersion; 4% sulfolane; 16% ethylene glycol; 71.6% deionized water. The completed ink in a closed container showed no settling after about 10 months at nominal ambient conditions (25° C.).

EXAMPLE II

To 15 gram of CSX440L carbon black dispersion from CABOT was added 2 grams of polyoxyethylene amino bisphosphonate with a molecular weight of about 2,500 and 8 grams of water by mixing and stirring for 60 hours at room temperature. The resulting dispersion of which 25 gram were taken, was further diluted with 13.34 grams of ethylene glycol and 3.41 grams of sulfolane. The ink was completed by adding 45.096 grams of water to provide a final composition by weight percent: 5.76% Cabot CSX440L dispersion; 2.4% stabilizer; 4% sulfolane; 16% ethylene glycol; and 71.6% deionized water.

EXAMPLE III

An ink is prepared by weighing out 16 grams of ethylene glycol to which is added 4 grams of sulfolane. To the mixture is added with stirring in a 150 mL glass bottle, 60 grams of a FLAME BLACK carbon black dispersion containing 10 weight percent carbon black and about 3 weight percent of a polyoxyethylene amino bisphosphonate stabilizer with a molecular weight of about 2,500, and where n the number of ethoxylates is about equal to 50. The ink is balanced by adding 20 grams of water.

EXAMPLE IV

An ink is prepared in accordance with Example III with the exception that the FLAME BLACK carbon black consisted of 15 weight percent carbon black and 3 weight percent polyethyleneoxide amino bisphosphonate stabilizer with a molecular weight of about 2,500, and n equal about 50.

EXAMPLE V

An ink is prepared in accordance with Example III with the exception that the FLAME BLACK carbon black consisted of 10 weight percent carbon black and 3 weight percent polyethyleneoxide amino bisphosphonate stabilizer, with a molecular weight of about 3,300, and n equal to about 70.

EXAMPLE VI

An ink is prepared in accordance with Example III with the exception that the FLAME BLACK carbon black consisted of 15 weight percent carbon black and 3 weight percent polyethyleneoxide amino bisphosphonate stabilizer with a molecular weight of about 3,300, and n equal to about 70.

EXAMPLE VII

An ink is prepared in accordance with Example III with the exception that the FLAME BLACK carbon black consisted of 20 weight percent carbon black and 3 weight percent polyethyleneoxide amino bisphosphonate stabilizer, with a molecular weight of about 3,300, and n equal to about 70.

Other modifications of the present invention may occur to one of ordinary skill in the art based upon a review of the present application and these modifications, including equivalents thereof, are intended to be included within the scope of the present invention.

What is claimed is:

1. An ink composition comprising: aqueous liquid vehicle, a colorant, and an amino bisphosphonate dispersant compound.

2. An ink composition comprising: aqueous liquid vehicle, colorant particles having associated with the surface thereof at least one alkoxylated amino bisphosphonate stabilizing compound of the formula

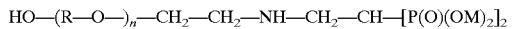

wherein R is an alkyl with from 1 to about 20 carbon atoms, n is a number of from about 20 to about 70, and M is —H, an alkali metal, an alkaline earth, and ammonium ion, or an alkyl with from 1 to about 20 carbon atoms.

3. A composition in accordance with claim 2, wherein the pigment is carbon black, R is —$CH_2$—$CH_2$—, and M is —H.

4. A composition in accordance with claim 2, wherein the stabilizer compound has a weight average molecular weight from about 2,200 to about 4,000, and is present in an amount of from about 0.09 to about 2 percent by weight of the total ink mixture.

5. A composition in accordance with claim 1, wherein the colorant particles are pigments selected from the group consisting of carbon black, magnetites, cyan, magenta, yellow, red, blue, green, orange, and mixtures thereof, and are present in an amount of from about 1 to about 20 weight percent.

6. A composition in accordance with claim 1, wherein the colorant is present in an amount of from about 2 to about 7 weight percent.

7. A composition in accordance with claim 1, wherein the colorant is a pigment with a particle size of from about 0.05 to about 10 microns.

8. A composition in accordance with claim 1, wherein the colorant is a carbon black dispersion with a particle size distribution with at least about 90 percent by weight of the particles with a diameter of about 0.05 to about 0.2 microns and the balance of particles with a diameter of about 0.2 to about 2.0 microns.

9. A composition in accordance with claim 1, wherein said aqueous liquid vehicle is water and homogenous mixtures of miscible organic solvents, and is present in an amount of from about 75 to about 99 weight percent of the total composition.

10. A composition in accordance with claim 1, wherein the ink has a latency of from about 1 to about 20 seconds.

11. A composition in accordance with claim 1, wherein the surface tension of the ink is in the range of about 20 dyne/cm to about 70 dyne/cm.

12. A composition in accordance with claim 1, wherein the viscosity of the ink is in the range of about 1.0 centipoise to about 5.0 centipoise.

13. A composition in accordance with claim 1, wherein the ink composition has a drying time of from 0 to less than about 15 seconds when jetted onto plain paper in an ink jet printing process at ambient conditions.

14. A composition in accordance with claim 1, wherein the ink contains at least one additive selected from the group consisting of biocides, humectants, chelating agents, viscosity modifiers, and mixtures thereof.

15. An ink composition comprising:
an aqueous liquid vehicle;
pigment particles;
and an alkoxylated amino bisphosphonate compound selected from the group consisting of a) compounds of the formula

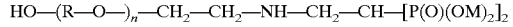

wherein R is an alkyl with from 1 to about 20 carbon atoms, n is a number of from about 20 to about 70, and M is —H, an alkali metal, an alkaline earth, and ammonium ion, or an alkyl with from 1 to about 20 carbon atoms; and b) compounds of the formula

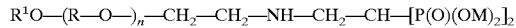

wherein R is an alkyl with from 1 to about 20 carbon atoms, $R^1$ is an alkyl or carboxylate with from 1 to about 20 carbon atoms, or an aryl or alkylaryl with from about 6 to about 30 carbon atoms, n is a number of from about 20 to about 70, and M is —H, an alkali metal, an alkaline earth, and ammonium ion, or an alkyl with from 1 to about 20 carbon atoms.

16. A composition in accordance with claim 2 wherein the weight ratio of said carbon black to said stabilizer compound is from about 3:1 to about 10:1.

17. A process for generating images onto a substrate which comprises incorporating an ink composition which comprises the composition of claim 1 into an ink jet printing apparatus and causing droplets of the ink composition to be ejected in an imagewise pattern onto the substrate, said substrate being selected from the group consisting of paper, transparency materials, plastics, polymeric films, metals, and wood, wherein the image formed on the substrate dries in no more than about 15 seconds.

18. A process comprising: applying in image-wise fashion to a receiving substrate in an ink jet printer having at least one nozzle of a channel width or diameter ranging from about 1.0 to about 4 microns the ink composition of claim 1, and wherein high resolution images result where edge acuity is excellent and smear is eliminated or minimized.

19. A process in accordance with claim 18, wherein said ink jet printer provides 600 spots per inch (spi).

* * * * *